Oct. 14, 1924.
I. S. DEMENT
1,511,270
METER READING DEVICE
Filed Sept. 15, 1921  5 Sheets-Sheet 1
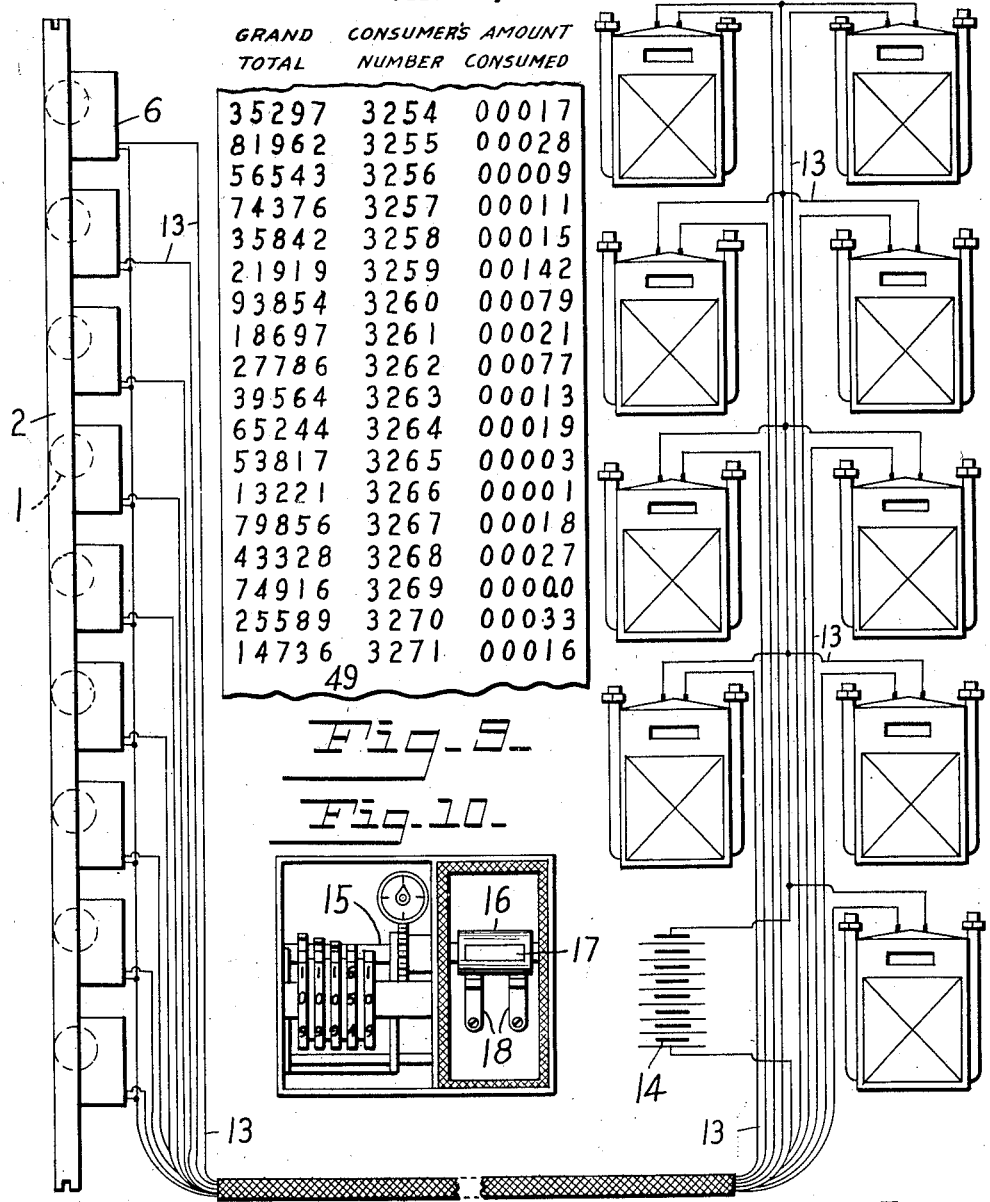
Fig. 9.
Fig. 10.
Fig. 1.
Fig. 11.
Inventor
ISAAC S. DEMENT
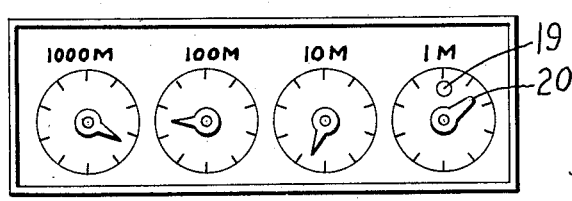
Attorney

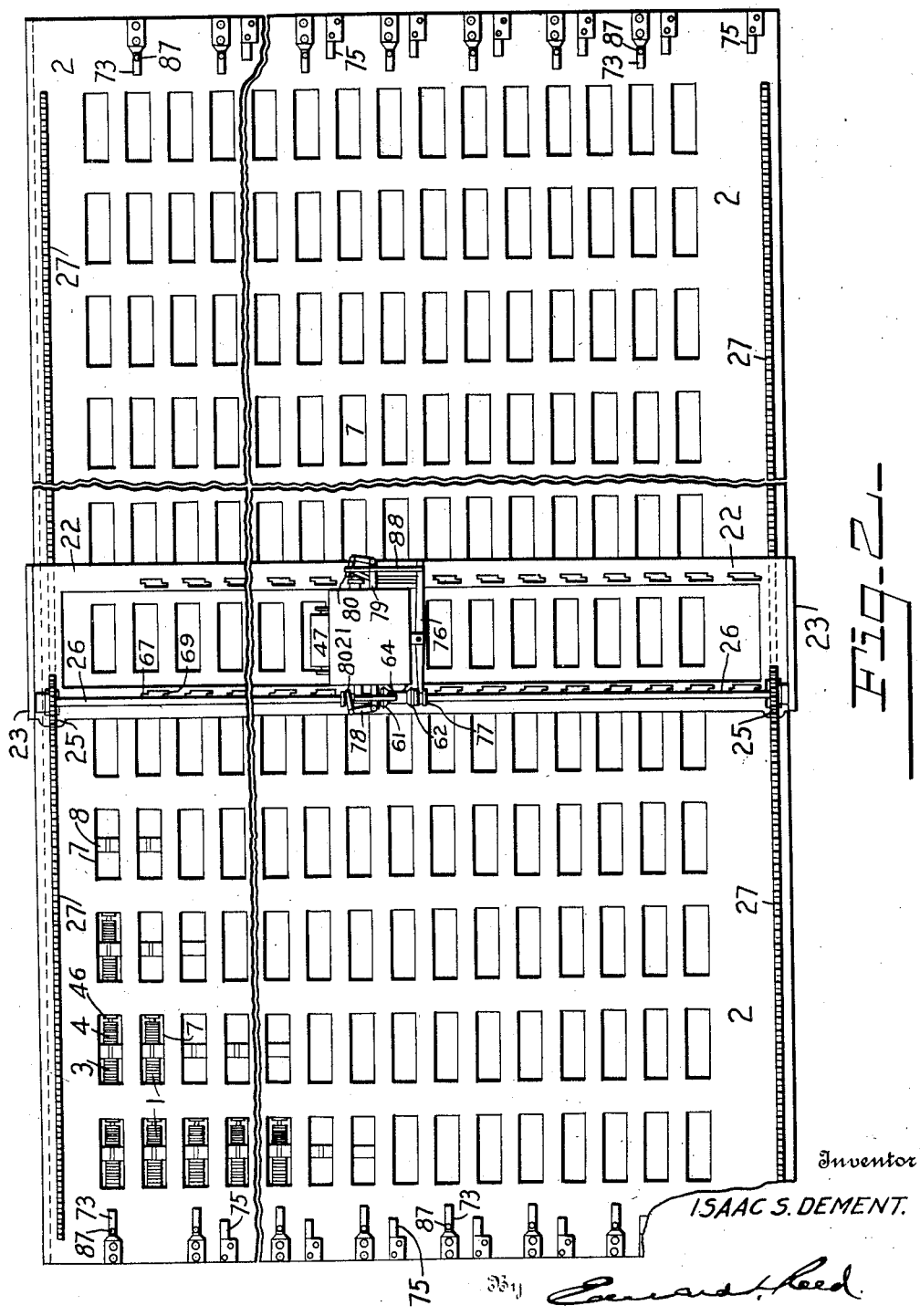

Oct. 14, 1924.
I. S. DEMENT
METER READING DEVICE
Filed Sept. 15, 1921
1,511,270
5 Sheets-Sheet 3
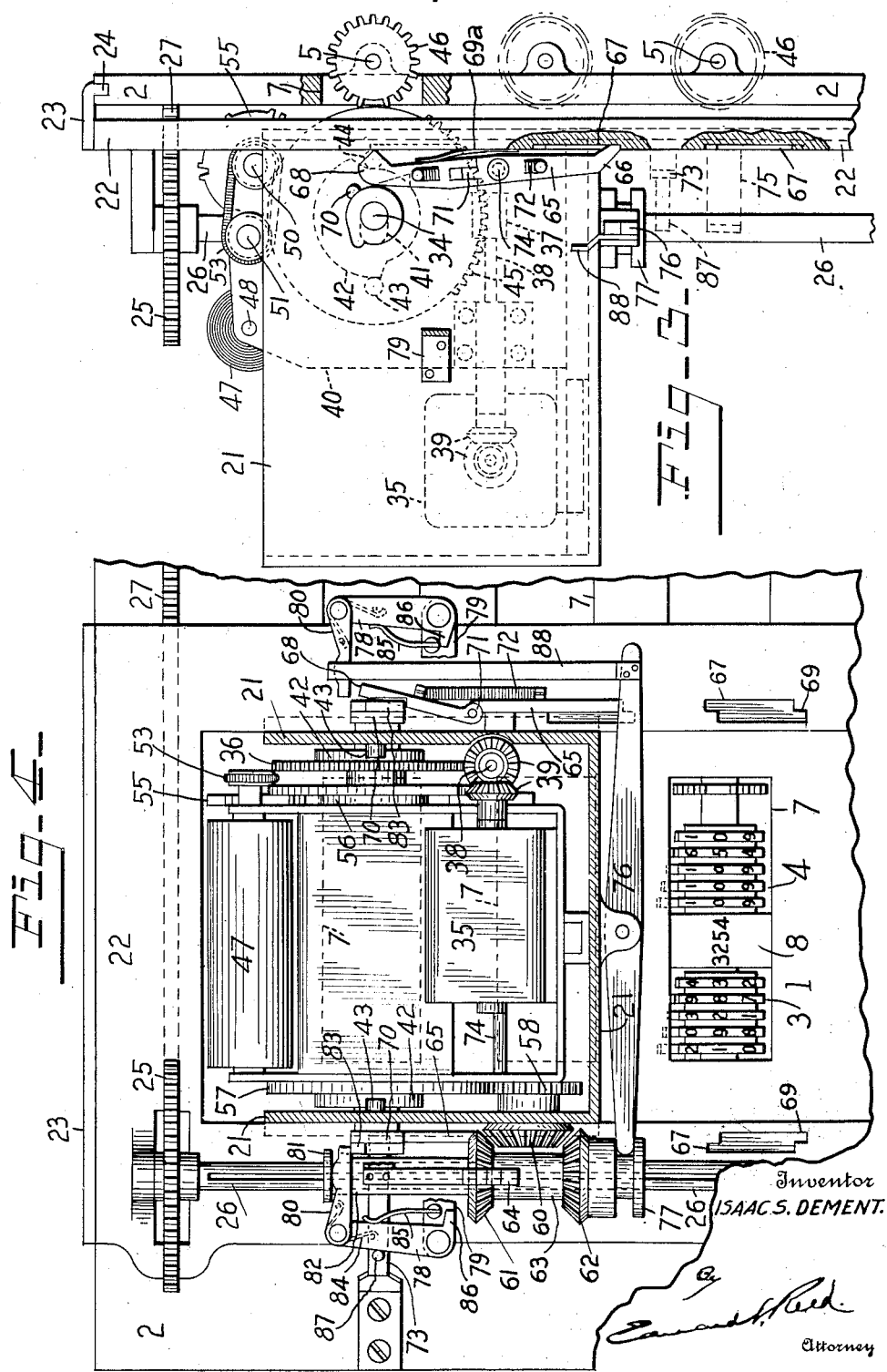

Oct. 14, 1924.
I. S. DEMENT
METER READING DEVICE
Filed Sept. 15, 1921  5 Sheets-Sheet 4
1,511,270
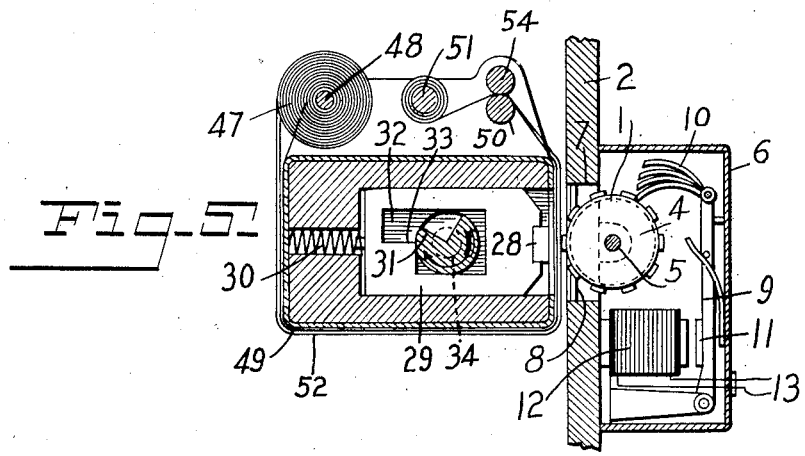
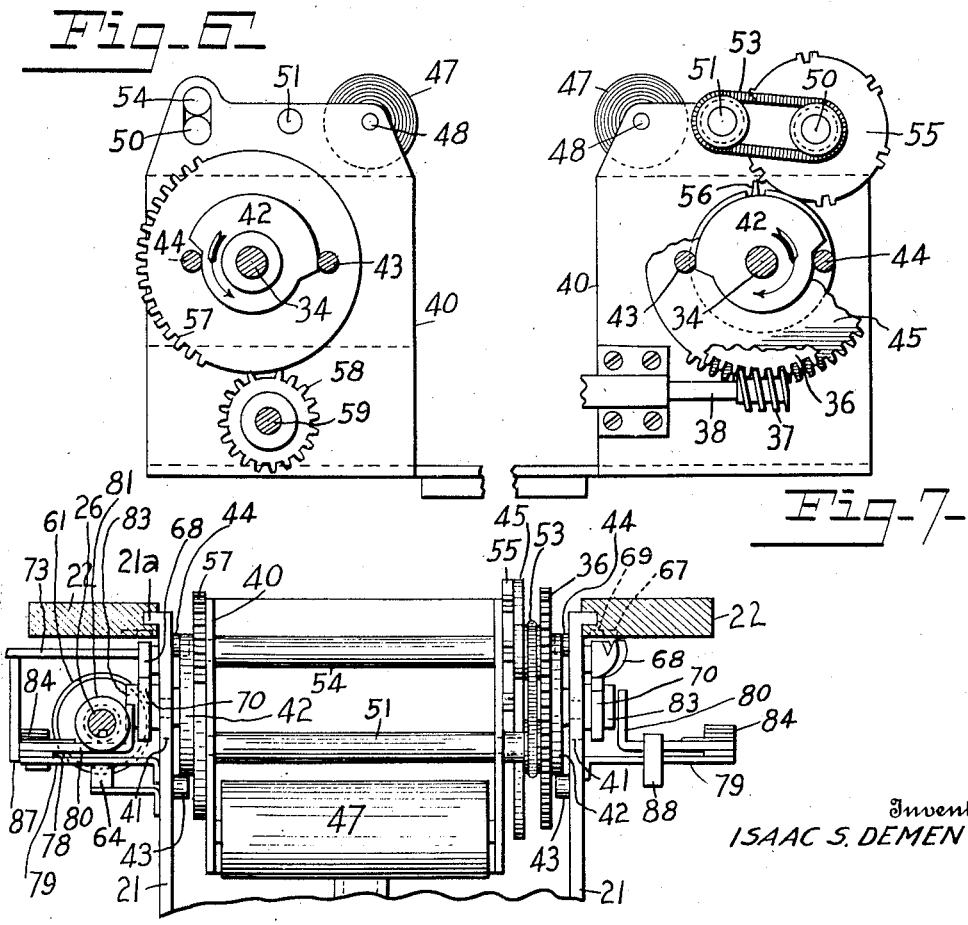
Inventor
ISAAC S. DEMENT.
By Edward Reed
Attorney

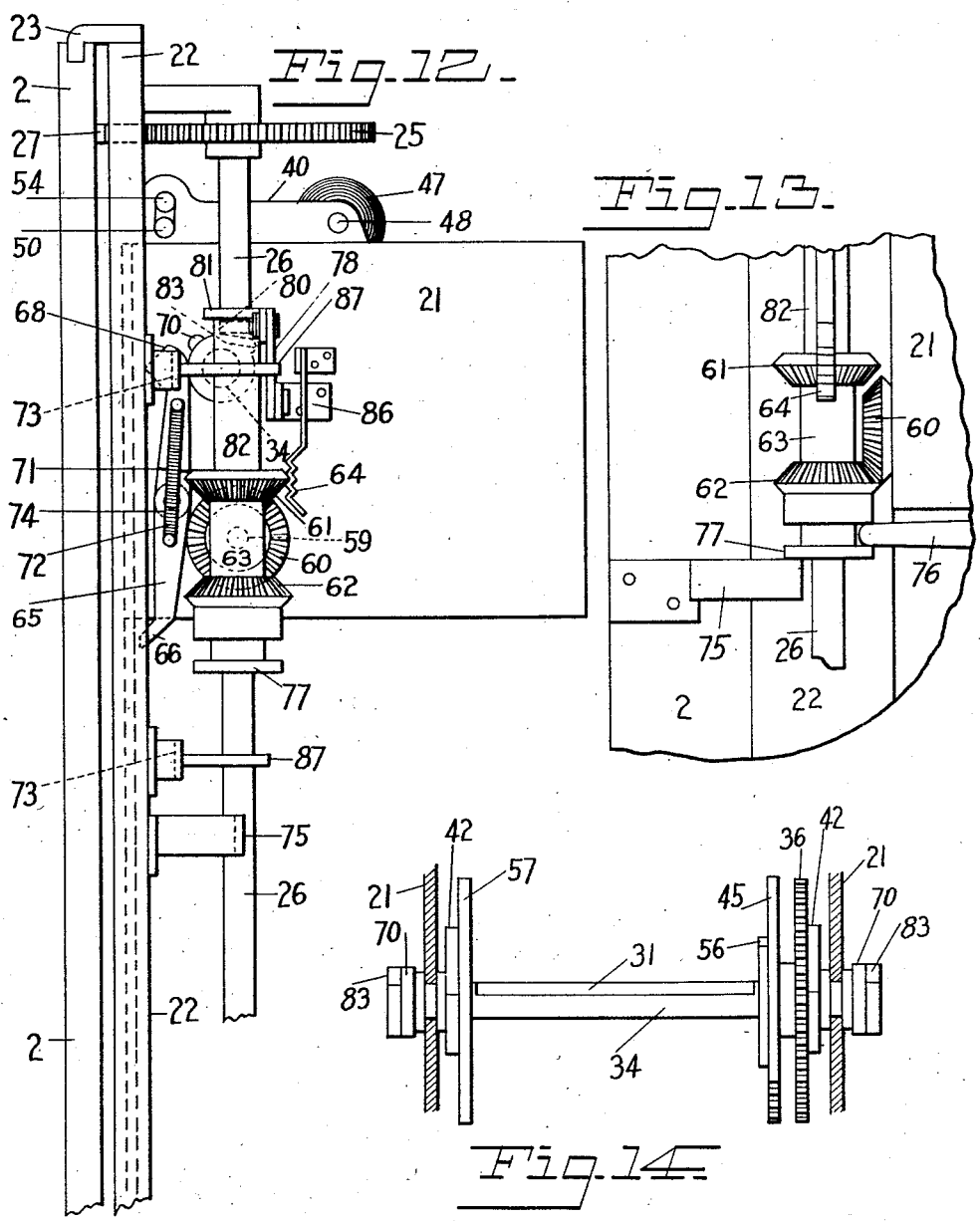

Patented Oct. 14, 1924.

1,511,270

UNITED STATES PATENT OFFICE.

ISAAC S. DEMENT, OF DAYTON, OHIO, ASSIGNOR TO PRINTING INDEX COMPANY, OF DAYTON, OHIO.

METER-READING DEVICE.

Application filed September 15, 1921. Serial No. 500,911.

*To all whom it may concern:*

Be it known that I, ISAAC S. DEMENT, a citizen of the United States, residing at Dayton, in the county of Montgomery and State of Ohio, have invented certain new and useful Improvements in Meter-Reading Devices, of which the following is a specification, reference being had therein to the accompanying drawing.

This invention relates to a meter reading device.

One object of the invention is to provide means whereby a meter, such as an electric meter or a gas meter, can be read at a point remote from the meter itself, thereby enabling readings to be taken from all the meters in a given territory at a central place, such as the office of a public service corporation.

A further object of the invention is to provide means located at a central point for taking a printed record of the readings of a plurality of meters located at points remote from said central place.

A further object of the invention is to provide means operating automatically to take such a printed record from a large number of recording devices, each of which is connected with a meter.

A further object of the invention is to provide such a device which will be simple in its construction and operation and may be operated at a high rate of speed, thereby enabling a large number of meters to be read in a very short time, and, further, eliminating the possibility of mistakes in taking the reading.

Other objects of the invention will appear as the mechanism is described in detail.

In the accompanying drawings Fig. 1 is a diagrammatical view of a plurality of meters, showing the same connected with a corresponding plurality of recording devices; Fig. 2 is a front elevation, partly broken away, of an index board showing the record taking mechanism mounted thereon; Fig. 3 is a side elevation of the printing box and a portion of the index board, showing the same partly broken away; Fig. 4 is a front elevation of the same with the casing shown in section; Fig. 5 is a sectional view taken through one of the recording devices and the printing mechanism; Fig. 6 is a side elevation of the supporting frame for the printing device and its associated parts, looking from the left in Fig. 4; Fig. 7 is a similar view looking from the right in Fig. 4; Fig. 8 is a plan view of the printing box, partly broken away; Fig. 9 is a portion of the record taken by the printing mechanism; Fig. 10 is a detail view showing a circuit closer for closing the circuit to a recording device, as applied to a gas meter; Fig. 11 shows such a circuit closer applied to an electric meter; Fig. 12 is an end elevation of the mechanism shown in Fig. 4 looking from the left; Fig. 13 is a front elevation of the shiftable gear structure and its cooperating parts; and Fig. 14 is a detail view of the printing shaft with its associated cams and gears.

In these drawings I have illustrated one embodiment of my invention and have shown the same as comprising a plurality of recording devices, each operatively connected with a gas meter arranged at a location remote from the recording device, the registering device at the meter being so connected with the corresponding recording device that the latter will record the amounts registered on the meter register. The recording devices are arranged in groups and I have provided a printing mechanism adapted to be successively moved into and out of operative relation with each recording device of any group and to take a printed record from that recording device. The printing mechanism is power operated and automatically controlled to cause it to move successively into line with the several recording devices and to take the records from said devices. The mechanism may take various forms and it will be understood that the particular construction and arrangement here illustrated have been chosen for the purpose of illustration only.

In that embodiment of the invention here illustrated I have shown a plurality of recording devices, or indexes, 1 mounted on a suitable supporting structure, such as an index board 2, and arranged in parallel rows, the rows extending both horizontally and vertically and intersecting one another. The recording devices, or indexes, may be of any suitable character which will record the registrations made at the meter and from which a record can be taken. As here shown the recording device comprises two groups of counter wheels indicated as a whole at 3 and 4, these counter wheels being loosely mounted on a common shaft 5, mounted in a casing 6 secured to the rear side of the index board 2 with the counter wheels in line with an opening 7 in the index board through which they project. The counter wheels 3 record the present reading of the meter, that is, the grand total of registrations on the meter and are never reset. The counter wheels 4 register the amount used, that is, the amount registered on the meter subsequent to the last previous reading and these counter wheels are reset after each record is taken. I also prefer that the record shall carry the number of the meter from which the reading has been taken and I have here shown an electrotype, or the like, 8 bearing the meter number, arranged between the two groups of counter wheels so that the record taken from the recording device will include the present reading, the meter number and the amount used, as shown in Fig. 9. The recording devices, or counter wheels, may be actuated by means controlled by the register at the meter and this may be accomplished in any suitable manner. In the present construction I have mounted in the casing 6 of each recording device a lever, or pawl arm, 9 on which are mounted a plurality of pawls 10, the pawls being mounted on a common axis and arranged in staggered relation one to the other, that is, each succeeding pawl has its nose spaced a greater distance from the axis of the counter wheels than the preceding pawl. The pawl for the units counter wheel of each group is arranged nearest the axis and will at all times be in operative engagement with its counter wheel. In the present construction I have not provided the counter wheels with ratchet wheels but have utilized the type projections on the counter wheels themselves as ratchet teeth with which the pawls cooperate. Every counter wheel, except the last, is provided with a recess or opening in its periphery which is so arranged with relation to the "9" on the counter wheel that when this figure is in printing position the pawl will enter the recess, thereby allowing all the pawls to move downwardly and bringing that pawl adjacent to the one which has entered its recess into operative relation to its counter wheel so that the next operation of the pawls will cause both counter wheels to be advanced. The pawl carrying arm, or lever, 9 has a part, 11, which constitutes the armature for an electromagnet 12 which is mounted in the casing 6 and connected in a circuit 13 which leads to a circuit breaker and closer, which is controlled by the registering device at the meter, which, as has been explained, may be located at a point remote from the recording device. The circuit is also connected with a suitable source of current supply, such as a battery 14 so that when the circuit breaker and closer is closed the magnet 12 will be energized and the pawls operated to advance the recording devices one unit.

Any suitable means may be provided for controlling the circuit breaker and closer and this means will vary in construction with different types of meters. In Fig. 10 I have shown a circuit breaker and closer applied to the registering device for a gas meter, in which I have mounted on the register shaft, 15, a drum 16 which rotates therewith and which has seated in its periphery a bar of conducting material, 17, the drum itself being of insulating material. Bearing upon the periphery of the drum are two brushes, or contact fingers, 18 so arranged that they will simultaneously engage the conductor bar 17 once upon each revolution of the shaft, thereby closing the circuit through the magnet 12 and actuating the recording device, it being understood that the recording device will record the amount in units equal to that recorded on the meter register by one complete revolution of the shaft 15. In Fig. 11 I have shown a circuit breaker and closer for an electric meter in which I have mounted on the dial of the lowest denomination a contact point 19 with which is connected one side of the circuit 13 and have connected the other side of the circuit 13 with the pointer, or indicating hand, 20, whch is arranged to engage the contact point 19 and close the circuit once upon each complete rotation of the pointer. Obviously, if it is desired to record the amount used in units smaller than that represented by one complete revolution of the pointer additional contact points may be provided and properly connected in the circuit.

The record taking device, by means of which the record is printed from the type wheels of the recording device is mounted within the main frame, or casing, 21 which is herein referred to as the printing box. This printing box is mounted on a carriage 22 adapted to move across the index board 2 in one direction, to carry the printing box successively into line with the recording devices of one row, and the printing box is movably mounted on the carriage to enable it to be moved in to line with different rows of recording devices. To this end the inner vertical edges of the housing 21 are provided with laterally extending ribs 21$^a$ which travel in guideways, or grooves, formed in the carriage. As here shown, the carriage 22 is slidably mounted for horizontal movement on the index board which is arranged in a vertical position, the carriage having guide members 23 arranged at its upper and lower ends and movably mounted in guideways, or grooves, 24 formed in the upper and lower edges of the index board. Movement is imparted to the carriage by means of gears 25, mounted on a shaft 26 extending lengthwise thereof, and meshing with toothed racks 27 extending lengthwise to the index board at the top and bottom thereof respectively, the gears being rigidly secured to the shaft and the shaft being mounted in fixed bearings on the carriage so that the rotation thereof will cause the carriage to travel lengthwise of the index board, thereby bringing the printing box successively into line with the recording devices of that row for which it is adjusted.

The printing device itself preferably comprises a platen 28 mounted for movement toward and from the type wheels. A single platen may be used for the several type wheels, but I prefer to use individual platens as more satisfactory impressions can be secured. Each platen is mounted on a slide bar 29 which is acted upon by a spring 30 which tends to move it toward the type wheels. Each slide bar is also acted upon by a cam 31 which holds it normally in its retracted position against the tension of the spring 30 and releases the same to permit it to be actuated by the spring. As here shown, each slide bar has formed therein an opening 32 having a shoulder 33 against which the cam bears. The several cams are mounted upon an operating shaft 34 which is driven from a motor 35 mounted on the main frame of the printing box and connected with the shaft 34 by means of a worm gear 36 secured to that shaft and meshing with a worm 37 carried by a shaft 38 which is connected with the motor by beveled gears 39. The shaft 34 is driven continuously in one direction by the motor and the cams 31 are so arranged that the platens will be caused to operate at the proper time during each rotation of the shaft.

In order that the printing device may have ample clearance in its movement from one recording device to another, I have mounted it in a supplemental frame 40 in the walls of which the shaft 34 is journaled. The side walls of the main frame of the printing box 21 are provided with horizontal slots 41 through which the shaft 34 extends and which permit that shaft and the supplemental frame 40 to have bodily movement toward and from the recording device. This movement is imparted to printing device by means of a cam 42 secured to the shaft 34 and arranged between the pins 43 and 44 which preferably extend inwardly from the side walls of the main frame 21, there being in the present construction a cam 42 on each side of the supplemental frame 40. The cam is so arranged with relation to the pins 43 and 44 that when that portion of the cam having the longer radius is in engagement with the pin 44 the supplemental frame of the printing device will be forced outwardly away from the recording device and when said portion of the cam engages the pin 43 the supplemental frame of the printing devices will be forced inwardly and into operative relation to the recording device. These movements are so timed that the printing device will be brought into operative relation to the recording device immediately after the printing box as a whole has been moved into line with that recording device and will be retained in operative relation thereto until the printing and resetting operations have been completed.

As has been explained, the counter wheels 4 of the recording device are reset to zero after each printing operation and this is accomplished in the present device by means of a mutilated gear 45 secured to the shaft 34 and cooperating with a gear 46 secured to the shaft 5 of the recording device. The mutilated gear 45 is provided with a number of teeth sufficient to impart one complete rotation to the gear 46 and these teeth are so arranged with relation to the cams 31 and 42 that they will mesh with the teeth of the gear 46 after the platens 28 have been retracted and will be moved out of mesh therewith prior to the movement of the printing device into an inoperative position. The resetting devices may be of any suitable character by means of which the several counter wheels may be returned to their zero positions by one complete rotation of the counter shaft. As there are various well known means for accomplishing this it is not thought necessary to illustrate or describe the same.

The records from the recording devices are preferably taken on a strip of paper, such as is shown in Fig. 9 and in the present arrangement this strip of paper is carried in a roll 47 mounted on a shaft 48 on the main frame 21 of the printing box and the strip of paper, which is shown at 49, extends downwardly about the supplemental frame 40, thence upwardly between the platens 28 and the type wheels and through feeding rolls 50 and 54 to a rewinding roller 51. The impression may be taken from the type wheels on the paper, either by means of carbon paper, inked ribbon, or any other suitable inking device, but in the present construction I have wound a strip of carbon paper on the roll 47 with the record paper, as shown at 52 and this carbon paper is interposed between the record paper and the type wheels. The lower feeding roll or shaft 50 is actuated to advance the paper one step after each printing operation and to this end it is provided with a Geneva gear 55. This Geneva gear cooperates with a one toothed gear 56 mounted on the main operating shaft 34, the arangement being such that the tooth of the gear 56 will engage the Geneva gear subsequent to the completion of the printing operation and the withdrawal of the printing device into its inoperative position, thereby advancing the paper the desired distance after it has been moved out of contact with the type wheels. The rewinding roll 51 is driven from the shaft 50 by a belt 53 and suitable pulleys in the present instance.

After having thus moved the printing devices into operative relation to the type wheels, taken a record therefrom, reset the amount used type wheel to zero, moved the printing devices into an inoperative position, and advanced the paper, the carriage is advanced a distance sufficient to bring the printing box into line with the next succeeding recording device. This movement is imparted to the carriage from the motor 35 through the main operating shaft 34, the latter being in the present instance provided with a mutilated gear 57 arranged to cooperate with a gear 58 carried by a shaft 59 mounted on the main frame 21 of the printing box and adapted to be so connected with the driving shaft 26 of the carriage that the carriage may be moved in either direction by the movement of the shaft 59 in a single direction. In the present instance, the shaft 59 has secured thereto a beveled gear 60 arranged between and adapted to mesh with either of two beveled gears 61 and 62, preferably connected one to the other by a hub 63 and splined to the shaft 26 so that either the gear 61 or the gear 62 may be moved into mesh with the gear 60, thereby enabling the direction of movement of the shaft 26 to be reversed. The gear structure is held in either position by means of a resilient detent 64 engaging the upper gear 61 to retain it in adjusted position. The detent 64 is here shown as a spring arm having one face serrated or notched to engage the edge of the gear 61 in any position to which that gear may be moved. After the printing box has been moved into alinement with the next recording device the cycle of operations above described is repeated.

After a record has thus been taken from each recording device of a row of recording devices the printing box 21 is shifted on the carriage 22 to bring it into line with another row of recording devices. In the present instance the printing box is placed in operation at the top of the index board and gravity is utilized to move the same downwardly from row to row of the recording devices. The downward movement of the printing box is automatically controlled to cause it to move down a distance equivalent to one row of recording devices when it reaches the end of any row of recording devices. As here shown, this movement is controlled by an escapement pawl 65 pivotally mounted on the main frame 21 of the printing box and having its lower end, or nose, 66 arranged to enter a recess 67 in the carriage 22, there being a row of these recesses along each side of the carriage and there being an escapment pawl 65 on each side of the printing box. The upper end of the escapement pawl 65 has a tapered nose 68 adapted to enter a recess 69 formed in the face of the carriage and thus permit the nose 66 of the pawl to be moved out of its recess and to thus release the printing box for downward movement. As the printing box moves downwardly the upper nose 68 of the pawl will engage the lower edge of its recess and positively move the nose 66 thereof into the next lower recess, thus causing the movement of the printing box to be checked as soon as the nose 66 of the pawl reaches the bottom of this next recess. Inasmuch as the nose 68 of the pawl normally lies opposite the upper end of its recess a spring 69ª is provided which acts on the upper portion of the pawl to hold the lower end thereof normally in its recess. As here shown, the two rows of recesses 67 and 68 in the face of the carriage are formed very close together and merge one into the other, but they function as separate recesses. Mounted on the main operating shaft 34 is a cam 70 arranged to engage the upper end of the pawl 65 and actuate the same to move the lower end thereof into an inoperative position. Inasmuch as the cam 70 makes a complete rotation upon each recording taking operation and it is desirable that the pawl should be actuated only when the carriage is at the end of a row of recording devices, I have provided means for normally preventing the cam from engaging the pawl. To this end the upper portion of the pawl is pivotally mounted on the lower portion thereof, at 71, so that it can move about a transverse axis out of the path of the cam 70 and a spring 72 acts on the pivoted part of the pawl to hold the same normally out of the path of the cam. When the carriage is moved into line with the last recording device of the row the pivoted upper portion of the pawl 65 will be engaged by a projection, or stop finger, 73, fixed on the index board, which will move the pivoted end of the pawl into line with the cam, thus causing it to be engaged thereby and the printing box released for downward movement. The arrangement of the cam 70 on the shaft 34 is such that the pawl 65 will not be actuated until all the other operations have been completed. As has been stated there is a pawl 65 on each side of the printing box and these pawls are mounted on a common shaft, or pivot rod, 74 so that when either pawl is actuated by its cam both pawls will be moved into their inoperable positions and the printing box will move downward by gravity until the pawls engage the next recess.

When the printing box is shifted on the carriage from one row of recording devices to the next the direction of movement of the carriage is automatically reversed, this being accomplished by shifting the beveled gears 61 and 62 with relation to the driving gear 60. When the carriage is at the left hand end of the index board and the printing box moves downwardly the lower end of the gear structure, 61 and 62, will engage a stop 75, fixed to the end of the index board, and the gear structure will be moved upwardly to engage the gear 62 with the gear 60. When the carriage is at the right hand end of the instrument board the gear structure will be shifted by means of a lever 76 which is pivotally mounted on the main frame 21 of the printing box and has one end extending into a grooved collar 77 forming part of the gear structure and has its other end arranged to engage the stop 75 on the end of the index board, thus causing the gear structure to be moved in the opposite direction. The operative portion of the stop 75 is spaced a greater distance from the index board 2 than is the operative portion of the stop 73 and is arranged in a different vertical plane, as shown in Fig. 3, so that the one stop will not interfere with the parts which are to be actuated by the other stop.

When the printing box is in operative relation with the last recording device of a row of recording devices it, of course, can have no further lateral movement and it is desirable that the mechanism for imparting lateral movement to the printing box should be rendered inoperative until the printing box has been moved into line with another row of recording devices and the mechanism for moving the same laterally has been reversed. This may be accomplished in various ways but in the present construction I have provided means for moving the beveled gears 61 and 62 into a neutral position, in which they are both out of mesh with the beveled gear 60. For this purpose I prefer to employ a cam operated mechanism which is normally inoperative but is rendered operative when the printing box is moved into line with the last recording device of the row. As here shown, this mechanism comprises a lever 78 pivotally mounted at its lower end on a bracket 79 mounted on a support fixed with relation to the printing box, and preferably mounted on the casing 21. The arm 78 extends upwardly and has pivotally mounted on its upper end an arm 80 which extends transversely to the shaft 26 and is arranged in operative relation to a collar 81 carried by a sleeve 82 connected with the gears 61 and 62. The arm 80 is so arranged that its inner end will be moved into and out of line with a cam 83 mounted on the shaft 34. A suitable stop, or spring, 84 limits the downward movement of the arm 80 so that it will not drop down far enough to engage the face of the cam. A spring 85 acts on the lever 78 to hold the same and the arm 80 normally in their outermost position, their movement being limited by a projection 86 on the lever which engages a fixed stop. When the printing box is moved into operative relation with the last recording device of a row the lever 78 is engaged by a fixed stop, which is mounted on the index board and in the present instance shown as a pin 87 carried by the stop 73 which actuates the movable end of the escapement pawl, thereby causing the end of the arm 80 to be moved into operative relation with the cam 83. This cam may be so arranged as to actuate the arm 80 and move the gears 61 and 62 into their neutral positions at any time before the driving mechanism, for imparting lateral movement to the printing box, becomes operative, and the gears are held in their neutral positions by the detent 64 until the gears have been positively shifted by the vertical movement of the printing box, as above described. It will be understood that a cam operated mechanism, such as has just been described, is arranged at each side of the printing box, these mechanisms being identical with the exception that while the device on the left hand side of the printing box, Fig. 4, operates on the collar 81, the device on the right hand side operates on an upwardly extending rod 88 connected with the lever 76. It will be apparent, therefore, that when the printing box is in operative relation with the last recording device of any row the lateral feeding mechanism will be inoperative and will remain inoperative until the escapement pawl has been operated to permit the printing box to move downward, which movement imparts further movement to the beveled gears and causes one or the other of them to be brought into engagement with the driving beveled gear 60.

In the operation of the device as here shown it will be understood that the carriage is mounted initially at the right hand end of the index board, with the printing box in line with the upper row of recording devices. When the motor is set in operation the record will be taken from the first recording device, the amount used counters will be reset to zero, and the driving mechanism for the carriage will be actuated to advance the carriage and the printing box to the next recording device in the upper row. This operation will be repeated until the carriage reaches the extreme limit of its movement at the left hand end of the board. When the printing box is brought into alinement with the last recording device of the row the mechanism for advancing the same will be rendered inoperative and the stop 73 will move the upper end of the escapement pawl into the path of its cam but this cam is so timed that it will not engage the pawl until after the other operations have been performed. It will then actuate the pawl to release the printing box, the latter will move downwardly by gravity until it comes in line with the first recording device of the next row, and will be there stopped and supported by the pawls, and the continued rotation of the operating shaft will cause the cycle of operations necessary to the taking of the record and advancing of the carriage to be performed in the same manner as when the printing box is moved from one recording device to another in the same row. It will be apparent, that in this manner readings may be taken automatically from a very large number of meters as the recording taking mechanism will continue to operate until it reaches the last recording device of the bottom row and so far as the record taking mechanism is concerned there is no limit to the size of the index board and the number of recording devices mounted thereon. Preferably the printing box is supplied with a roll of paper sufficient for taking the readings of the recording devices on a single index board and when the mechanism is transferred to another board or is shifted to the starting point of the original board to take another reading therefrom a fresh supply of paper is provided, although, obviously, a large roll of paper could be used and that portion containing the records severed at the end of any given series of operations.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a mechanism of the character described, the combination with a meter having a registering device, of a recording device mounted at a point remote from said meter, electrical means for actuating said recording device comprising a circuit, means controlled by the meter register for closing said circuit and causing said recording device to be operated when the meter has registered an amount equal to the unit of registration of said recording device, and means for automatically and successively taking records from a plurality of such recording devices.

2. In a mechanism of the character described, the combination with a meter having a registering device, of a recording device mounted at a point remote from said meter, electrical means for actuating said recording device comprising a circuit, means controlled by the meter register for closing said circuit and causing said recording device to be operated when the meter has registered an amount equal to the unit of registration of said recording device, and a printing device adapted to be placed successively in printing position with relation to a plurality of such recording devices.

3. In a mechanism of the character described, a plurality of recording devices, means for actuating said recording devices respectively from meters located at points remote therefrom, a printing device to take a record from said recording devices, and means for moving said printing device successively into printing relation with said plurality of recording devices.

4. In a mechanism of the character described, a plurality of recording devices, mounted in line one with the other, separate means for actuating the respective recording devices, and a printing device for taking records from said recording devices, said printing device being movable successively into operative relation with the respective recording devices.

5. In a mechanism of the character described, a supporting structure, a plurality of recording devices mounted on said structure, means for actuating the respective recording devices, a printing device mounted on said structure for movement into operative relation to each of said recording devices, and means for operating said printing device to cause a record to be taken from that recording device with which it is in operative relation.

6. In a mechanism of the character described, a supporting structure, a plurality of recording devices mounted on said structure in parallel rows, means for actuating the respective recording devices, a printing device mounted on said structure for movement into operative relation with each of said recording devices, and means for operating said printing device to cause a record to be taken from that recording device with which it is in operative relation, and for moving said printing device from one recording device to another and from one row to another.

7. In a mechanism of the character described, a supporting structure, a plurality of recording devices mounted on said structure, means for actuating the respective recording devices, a carriage mounted for movement on said supporting structure, a printing device mounted on said carriage and movable therewith into operative relation to the several recording devices, and means for operating said printing device to cause a record to be taken from that recording device with which it is in operative relation.

8. In a mechanism of the character described, a supporting structure, a plurality of recording devices, mounted on said structure, means for actuating the respective recording devices, a printing device mounted on said structure for movement thereon in either of two directions, thereby enabling said printing device to be brought into operative relation with any recording device on said supporting structure, and means for operating said printing device to cause a record to be taken from that recording device with which it is in operative relation.

9. In a mechanism of the character described, a supporting structure, a plurality of recording devices mounted on said structure in intersecting rows, a carriage mounted on said structure for movement parallel with one of said rows, a printing device mounted on said carriage for movement thereon in a direction parallel with another of said rows, means to impart movement to said carriage and said printing device and to actuate said printing device to cause a record to be taken from one of said recording devices.

10. In a mechanism of the character described, a supporting structure, a plurality of recording devices mounted on said structure in parallel rows, a carriage mounted on said structure for movement in a direction parallel with said rows of recording devices, a printing device mounted on said carriage for movement in a direction transverse to said rows of recording devices to bring the same into line with different rows of recording devices, means for actuating said carriage to move said printing device into line with the recording devices of a given row and for shifting said printing device on said carriage to move it from one row to another, and means for actuating said printing device to cause a record to be taken from one of said recording devices.

11. In a mechanism of the character described, a supporting structure, a plurality of recording devices, mounted on said structure in parallel rows, a carriage mounted on said structure for movement in a direction parallel with said rows of recording devices, a printing device mounted on said carriage for movement in a direction transverse to said rows of recording devices to bring the same into line with different rows of recording devices, and means for actuating said carriage to move said printing device into line with the recording devices of a given row, and for shifting said printing device on said carriage to move it from one row to another, means for reversing the direction of movement of said carriage when said printing device is shifted from one row to another, and means for actuating said printing device to cause a record to be taken from one of said recording devices.

12. In a mechanism of the character described, a supporting structure, a plurality of recording devices mounted on said structure in parallel rows, a carriage mounted for movement in a direction parallel with said rows, a printing device mounted in said carriage for movement thereon from one row to another, means to actuate said printing device to cause a record to be taken from one of said recording devices means for actuating said carriage to move said printing device successively into line with the several recording devices of one row, normally inoperative means for causing said printing device to be shifted on said carriage, means arranged at the ends of said rows to render said last mentioned mechanism operative and to cause said printing device to be shifted from one row to another.

13. In a mechanism of the character described, a supporting structure, a plurality of recording devices mounted on said structure in parallel rows, a carriage mounted for movement in a direction parallel with said rows, a printing device mounted in said carriage for movement thereon from one row to another, means to actuate said printing device to cause a record to be taken from one of said recording devices, means for actuating said carriage to move said printing device successively into line with the several recording devices of one row, normally inoperative means for causing said printing device to be shifted on said carriage, means arranged at the ends of said rows to render said last mentioned mechanism operative and to cause said printing device to be shifted from one row to another, and means controlled by the shifting of said printing device on said carriage to reverse the direction of movement of said carriage.

14. In a mechanism of the character described, a supporting structure, a plurality of recording devices mounted on said structure, a printing box mounted for movement on said structure from one recording device to another, a printing device mounted in said printing box, means for actuating said printing device to cause a record to be taken from said recording device, and means for advancing said printing box to another recording device after said record has been taken.

15. In a mechanism of the character described, a supporting structure, a plurality of recording devices mounted on said structure, a printing box mounted for movement on said structure from one recording device to another, a printing device mounted in said printing box, means for actuating said printing device to cause a record to be taken from said recording device, said recording devices each comprising resetting mechanism, means carried by said printing box for actuating said resetting mechanism after the record has been taken, and means for advancing said printing box to another recording device as said resetting mechanism has been operated.

16. In a mechanism of the character described, a supporting structure, a plurality of recording devices mounted on said structure, a printing box mounted on said structure for movement from one recording device to another, a supplemental frame mounted in said printing box, a printing device carried by said supplemental frame, means for moving said frame and said printing device into and out of operative relation to one of said recording devices, means for actuating said printing device to cause a record to be taken from said recording device while said printing device is in operative relation thereto, and means for advancing said printing box to another recording device after said supplemental frame and said printing device have been moved into their inoperative positions.

17. In a mechanism of the character described, a supporting structure, a plurality of recording devices mounted on said supporting structure and each comprising a resetting gear, a printing box mounted on said supporting structure for movement from one recording device to another, a supplemental frame carried by said printing box, a printing device mounted on said supplemental frame, means for imparting movement to said supplemental frame relative to said printing box to move said printing device into and out of operative relation with that recording device with which the printing box is in line, a gear carried by said supplemental frame and arranged to be brought into operative relation to said resetting gear when said supplemental frame is moved toward said recording device, means for actuating said printing device and said gear to cause a record to be taken from said recording device and said resetting gear to be operated, and means for advancing said printing box to another recording device.

18. In a mechanism of the character described, a supporting structure, a plurality of recording devices carried by said supporting structure, and each comprising a resetting gear, a printing box mounted on said supporting structure for movement from one recording device to another, a supplemental frame carried by said printing box for movement toward and from said recording device, a printing device carried by said supplemental frame, a shaft journaled in said supplemental frame, a cam mounted on said shaft to control the operation of said printing device, a mutilated gear mounted on said shaft to cooperate with said resetting gear when said supplemental frame is moved toward said recording device, and means controlled by said shaft for moving said supplemental frame toward and from said recording device.

19. In a mechanism of the character described, a supporting structure, a plurality of recording devices carried by said supporting structure and each comprising a resetting gear, a printing box mounted on said supporting structure for movement from one recording device to another, a supplemental frame carried by said printing box for movement toward and from said recording device, a printing device carried by said supplemental frame, a shaft journaled in said supplemental frame, a cam mounted on said shaft to control the operation of said printing device, a mutilated gear mounted on said shaft to cooperate with said resetting gear when said supplemental frame is moved toward said recording device, another cam mounted on said shaft, and stops mounted in fixed relation to said supplemental frame and arranged to be engaged by said cam whereby said cam will cause said supplemental frame to be moved toward and from said recording device.

20. In a mechanism of the character described, a supporting structure, a plurality of recording devices mounted on said structure, a printing box mounted for movement from one recording device, to another, a printing device carried by said printing box, a shaft rotatably mounted on said printing box, a cam carried by said shaft to control the operation of said printing device, paper feeding devices associated with said printing device, means actuated by said shaft for operating said paper feeding device, and means for advancing said printing box from one recording device to another after said record has been taken.

21. In a mechanism of the character described, a supporting structure, a plurality of recording devices mounted on said structure, a printing box, a printing device carried by said box to take records from said recording devices, a shaft carried by said printing box, a motor for driving said shaft, a cam mounted on said shaft for controlling the operation of said printing device, and means actuated by said motor for advancing said printing box from one recording device to another.

22. In a mechanism of the character described, a supporting structure, a plurality of recording devices mounted on said structure, a printing box, a printing device carried by said box to take records from said recording devices, a shaft carried by said printing box, a motor for driving said shaft, a cam mounted on said shaft for controlling the operation of said printing device, means actuated by said motor for advancing said printing box from one recording device to another, and means carried by said shaft to control the operative connection between said motor and said advancing means.

23. In a mechanism of the character described, a supporting structure, a plurality of recording devices mounted on said structure, a carriage movably mounted on said supporting structure, a printing box mounted on said carriage for movement thereby into line with different recording devices, a printing device carried by said printing box to take records from said recording devices, a motor carried by said printing box, means operated by said motor to control the operation of said printing device, driving mechanism for imparting movement to said carriage, and means for operatively connecting said driving mechanism with said motor.

24. In a mechanism of the character described, a supporting structure, a plurality of recording devices mounted on said structure, a carriage movably mounted on said structure, a printing box mounted on said carriage and adapted to be moved thereby into line with different recording devices, a printing device carried by said printing box, a driving mechanism for imparting movement to said carriage, a motor, a shaft connected with said motor, a cam mounted on said shaft to control the operation of said printing device, and a mutilated gear to actuate said driving mechanism, said gear being driven from said shaft in timed relation to the movement of said cam.

25. In a mechanism of the character described, a supporting structure, a plurality of recording devices, mounted on said structure, a carriage movably mounted on said supporting structure, driving mechanism for imparting movement to said carriage and comprising a gear, a printing box mounted on said carriage for movement therewith into line with different recording devices, a printing device carried by said printing box and a shaft carried by said printing box, a motor carried by said printing box and operatively connected with said shaft, a cam secured to said shaft for controlling the operation of said printing device, and a mutilated gear secured to said shaft and arranged to cooperate with the gear of said driving mechanism.

26. In a mechanism of the character described, a supporting structure, a plurality of recording devices mounted on said structure and each comprising a resetting gear, a carriage movably mounted on said supporting structure, driving mechanism for imparting movement to said carriage and comprising a gear, a printing box mounted on said carriage for movement therewith into line with different recording devices, a printing device carried by said printing box, a motor, a shaft operatively connected with said motor, a cam carried by said shaft to control the operation of said printing device, a mutilated gear carried by said shaft to cooperate with said resetting gear, and a second mutilated gear carried by said shaft and adapted to cooperate with the gear of said driving mechanism, said cam and said mutilated gears being so arranged on said shaft that they will cause the operations of their respective mechanisms in the order named.

27. In a mechanism of the character described, a supporting structure, a plurality of recording devices mounted on said structure and each comprising a resetting gear, a carriage movably mounted on said structure, driving mechanism for said carriage comprising a gear, a printing box mounted on said carriage for movement therewith into line with different recording devices, a supplemental frame carried by said printing box and movable toward and from the supporting structure, a printing device carried by said supplemental frame to take records from said recording devices, a shaft carried by said printing box, a motor to drive said shaft, a cam mounted on said shaft to move said supplemental frame toward and from said supporting structure, a second cam mounted on said shaft to control the operation of said printing device, a mutilated gear mounted on said shaft and adapted to be brought into operative relation to said resetting gear when said supplemental frame is moved toward said supporting structure, and a second mutilated gear mounted on said shaft and adapted to cooperate with the gear of said driving mechanism.

28. In a mechanism of the character described, a supporting structure, a plurality of recording devices mounted on said structure in parallel rows, a carriage mounted on said supporting structure for movement in a direction parallel with said rows, a printing box mounted on said carriage for movement thereon in a direction transverse to said parallel rows, a detent to hold said printing box normally against movement on said carriage, and means for actuating said detent to release said printing box when said carriage is at the end of one of said rows.

29. In a mechanism of the character described, a supporting structure, a plurality of recording devices mounted on said structure in parallel rows, a carriage mounted on said supporting structure for movement in a direction parallel with said rows, a printing box mounted on said carriage for movement thereon in a direction transverse to said parallel rows, said carriage having a series of recesses arranged parallel with the line of travel of the printing box thereon, a pawl mounted on said printing box and adapted to engage said recesses to hold said printing box against movement, means carried by said printing box to disengage said pawl from said carriage, and means to automatically move said pawl into the next lower recess as said printing box moves downwardly.

30. In a mechanism of the character described, a supporting structure, a plurality of recording devices mounted on said structure in parallel rows, a carriage movably mounted on said structure, driving mechanism for said carriage, a printing box mounted on said carriage for movement thereon transversely to said parallel rows of recording devices, a printing device carried by said printing box, an operating shaft, a cam carried by said operating shaft to control the operation of said printing device, a pawl pivotally mounted between its ends on said carriage and having one end adapted to engage a shoulder on said carriage, and a cam mounted on said operating shaft and arranged to actuate said pawl to disengage it from said shoulder.

31. In a mechanism of the character described, a supporting structure, a plurality of recording devices mounted on said structure in parallel rows, a carriage movably mounted on said structure, driving mechanism for said carriage, a printing box mounted on said carriage for movement thereon transversely to said parallel rows of recording devices, a printing device carried by said printing box, an operating shaft, a cam carried by said operating shaft to control the operation of said printing device, a pawl pivotally mounted between its ends on said carriage and having one end adapted to engage a shoulder on said carriage, a cam mounted on said operating shaft to engage the upper end of said pawl and move the same out of engagement with said shoulder, said end of said pawl being supported normally out of the path of said cam, and means mounted on said supporting structure at the end of one of said rows or recording devices to move said end of said pawl into the path of said cam.

32. In a mechanism of the character described, a supporting structure, a plurality of recording devices mounted on said structure, a driving mechanism for said carriage, a printing box mounted on said carriage for movement thereon transversely to said rows of recording devices, a printing device carried by said printing box, an operating shaft, a cam on said shaft to control the operation of said printing device, means controlled by said operating shaft to cause said carriage to be advanced after each printing operation, a detent mounted on each side of said printing box and connected one to the other for movement about a common axis, said detents cooperating with shoulders on said carriage to hold said printing box normally against movement on said carriage, a cam mounted on said operating shaft at each side of said printing box to actuate the respective cams, each of said cams having a portion held normally out of line with its cam, and means mounted at the ends of said rows of recording devices to move one or the other of said pawls into the path of its cam, thereby causing both pawls to be disengaged from said carriage.

33. In a mechanism of the character described, a supporting structure, a plurality of recording devices mounted on said structure in parallel rows, a carriage movably mounted on said structure, driving mechanism to move said carriage in a direction parallel to said rows of recording devices, a printing box mounted on said carriage for movement transversely to said rows of recording devices, a printing device carried by said printing box, an operating shaft, a cam carried by said operating shaft to control the operation of said printing device, a second cam mounted on said operating shaft, a pawl mounted on said printing box on an axis arranged between its ends and having its lower end adapted to engage a part of said carriage to hold said printing box against downward movement, the upper end of said pawl being pivotally mounted for movement into and out of the path of said second cam, means for holding said upper end of said pawl normally out of the path of said second cam, and a projection mounted at the end of the row of recording devices to engage the upper end of said pawl and move it into the path of said cam.

34. In a mechanism of the character described, a supporting structure, a plurality of recording devices mounted on said structure in parallel rows, a carriage movably mounted on said structure, driving mechanism to move said carriage in a direction parallel to said rows of recording devices, a printing box mounted on said carriage for movement transversely to said rows of recording devices, a printing device carried by said printing box, an operating shaft, a cam carried by said operating shaft to control the operation of said printing device, a second cam mounted on said operating shaft, a pawl mounted on said printing box on an axis arranged between its ends and having its lower end adapted to engage a part of said carriage to hold said printing box against downward movement, the upper end of said pawl being pivotally mounted for movement into and out of the path of said second cam, means for holding said upper end of said pawl normally out of the path of said second cam, a projection mounted at the end of the row of recording devices to engage the upper end of the said pawl and move it into the path of said cam, and means controlled by the downward movement of said printing box to reverse the direction of operation of the driving mechanism for said carriage.

35. In a mechanism of the character described, a supporting structure, a plurality of recording devices mounted on said structure in parallel rows, a carriage mounted on said structure for transverse movement thereon, driving mechanism for said carriage comprising a gear, a printing box mounted on said carriage for movement lengthwise thereof, a printing device carried by said printing box, an operating shaft, a motor connected with said shaft to continuously rotate the same, a cam mounted on said shaft to control the operation of said printing device, a mutilated gear mounted on said shaft and adapted to engage the gear of said driving mechanism to impart transverse movement to said carriage, a pawl connected with said printing box and arranged to engage a part of said carriage to hold said printing box against downward movement, a cam mounted on said shaft, said pawl having a part held normally out of the path of said cam, and a projection mounted at the end of a row of operating devices to move said part of said pawl into the path of said cam.

36. In a mechanism of the character described, a supporting structure, a plurality of recording devices mounted on said structure in parallel rows, carriage extending across said supporting structure and mounted for transverse movement thereon, driving mechanism for said carriage comprising a shaft extending parallel therewith, a printing box mounted on said carriage for movement lengthwise thereof, a motor mounted on said printing box, an operating shaft carried by said printing box and driven by said motor, a printing device carried by said printing box, a cam mounted on said shaft to control the operation of said printing device, a shaft mounted on said printing box adjacent to said operating shaft, a mutilated gear carried by said shaft, adapted to engage said gear, opposed beveled gears connected one with the other and slidably mounted on the shaft of the driving mechanism for said carriage, a beveled gear mounted on the last mentioned shaft and arranged to cooperate with either of the first mentioned beveled gears, a pawl mounted on said printing box and arranged to engage a part of said carriage to hold said printing box against downward movement, an actuating cam for said pawl mounted on said operating shaft, said pawl having a part held normally out of the path of said cam, means mounted on said supporting structure at the end of a row of recording devices to move said part of said pawl into the path of said cam, and means controlled by the downward movement of said printing box to shift the opposed beveled gears on the shaft of said driving mechanism and thus reverse the direction of movement of said carriage.

37. In a mechanism of the character described, a plurality of recording devices mounted in line one with the other, separate means for actuating the respective recording devices, a printing device for taking records from said recording devices, said printing device being movable successively into operative relation with the respective recording devices, and means for preventing said movement of said printing device when the latter is in operative relation with the last recording device of said line.

38. In a mechanism of the character described, a plurality of recording devices mounted in line one with the other, separate means for actuating the respective recording devices, a printing device to take a record from said recording devices, means for moving said printing device successively into printing relation with said plurality of said recording devices, and means for rendering said moving means inoperative when said printing device is in operative relation with the last recording device in said line.

39. In a mechanism of the character described, a supporting structure, a plurality of recording devices mounted on said structure in parallel rows, means for actuating the respective recording devices, a printing device mounted on said structure for movement into operative relation with each of said recording devices, means for operating said printing device to cause a record to be taken from that recording device with which it is in operative relation, means for advancing said printing device from one recording device to another in the same row, and means for causing said printing device to move from one row of recording devices to the other, said advancing means being inoperative when the last mentioned means are operative.

40. In a mechanism of the character described, a supporting structure, a plurality of recording devices mounted on said structure in parallel rows, means for actuating the respective recording devices, a printing device mounted on said structure for movement into operative relation with each of said recording devices, means for operating said printing device to cause a record to be taken from that recording device with which it is in operative relation, driving mechanism for advancing said printing device from one recording device to another in the same row, and means for rendering said driving mechanism inoperative and comprising a cam and a part movable into and out of line with said cam, and means controlled by the position of said printing device for moving said part into line with said cam when said printing device is in operative relation with the last recordng device of a row.

41. In a mechanism of the character described, a supporting structure, a plurality of recording devices mounted on said structure, means for actuating the respective recording devices, a carriage mounted for movement on said supporting structure, a printing device mounted on said carriage and movable therewith into operative relation to the several recording devices, and means for operating said printing device to cause a record to be taken from that recording device with which it is in operative relation, means for advancing said carriage from one recording device to another in the same row comprising a driving gear and other gears mounted for movement into and out of mesh with said driving gear, a cam, means for operating said cam, and a device connected with said other gears and comprising a part movable into and out of operative relation with said cam for moving said gears into neutral positions with relation to said drivng gear, and a stop mounted in fixed relation to said carriage for moving said part of said device into operative relation with said cam.

42. In a mechanism of the character described, a supporting structure, a plurality of recording devices mounted on said structure in parallel rows, means for actuating the respective recording devices, a printing device mounted on said structure for movement into operative relation with each of said recording devices, means for operating said printing device to cause a record to be taken from that recording device with which it is in operative relation, driving mechanism for advancing said printing device from one recording device to another, a device connected with said driving mechanism to render the same inoperative and comprising a part movable from one position to another, a cam arranged to actuate said part when it is in one of said positions, and a stop fixed with relation to said printing device and arranged to move said part into a position to be operated by said cam when said printing device is in operative relation with the last recording device of a row.

In testimony whereof, I affix my signature hereto.

ISAAC S. DEMENT.